Oct. 16, 1923.
L. F. PERLICK
MITER BOX
Filed Jan. 20, 1922
1,471,003
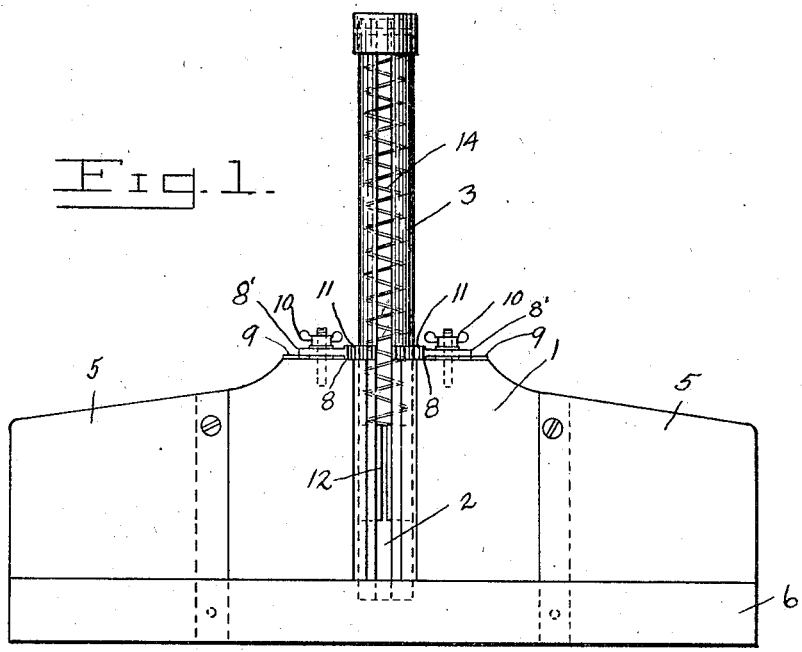
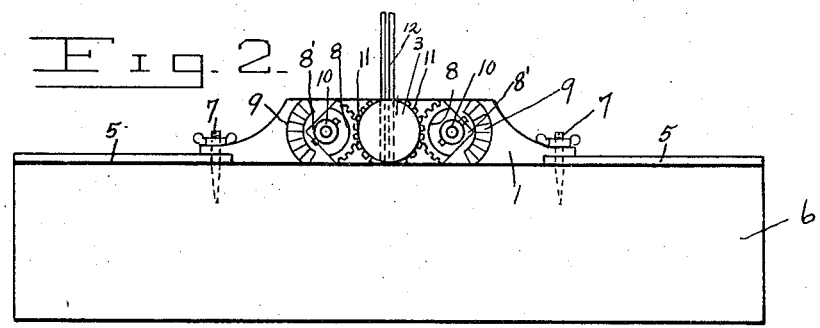
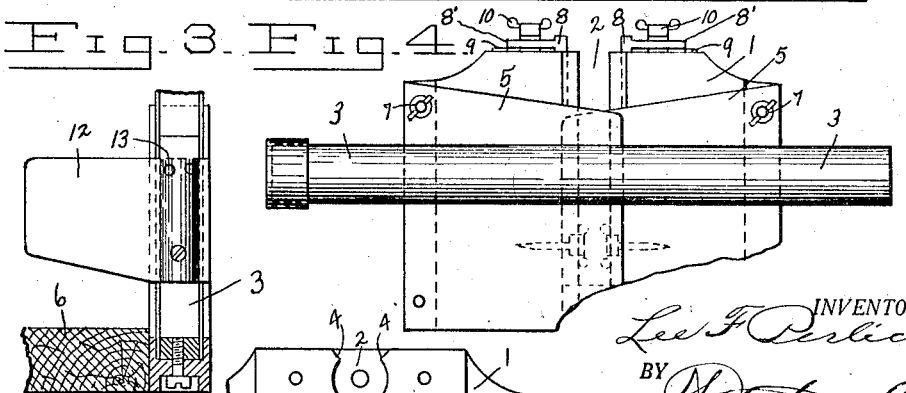

Patented Oct. 16, 1923.

1,471,003

UNITED STATES PATENT OFFICE.

LEE F. PERLICK, OF LOS ANGELES, CALIFORNIA.

MITER BOX.

Application filed January 20, 1922. Serial No. 530,659.

*To all whom it may concern:*

Be it known that I, LEE F. PERLICK, a citizen of the United States, residing in the city of Los Angeles, county of Los Angeles, and State of California, have invented certain new and useful Improvements in Miter Boxes, of which the following is the specification.

My invention relates to miter boxes and has as one of its objects to provide a simple, practical and accurate miter box, capable of being easily separated into its different parts for packing purposes.

A further object of my invention is to provide in a miter box an improved saw guide and saw feeding mechanism which functions properly no matter to what angle the saw is adjusted for use.

A further object of my invention is to provide a miter box whose parts can be reversed in order to adapt it for use in cutting pieces of large size.

Other objects and advantages will be apparent from the following description of one practical embodiment of my invention, taken in connection with the accompanying sheet of drawings, in which—

Figure 1 is a front elevation of a miter box embodying my invention;

Figure 2 is a top plan view thereof;

Figure 3 is a fragmentary, sectional view showing the saw guide in side elevation;

Figure 4 is a view showing my improved miter box in disassembled condition; and

Figure 5 is a top plan view of the body portion of my invention.

Referring now in detail to the drawings, my invention as here shown for illustrative purposes comprises a body 1, having an open vertical center 2, the adjacent faces of which are concaved to receive a slotted tubular member 3, with the four corners, at the opposite sides of the concaved faces, bevelled as at 4—4. Wing or extension members 5—5, are detachably secured to the opposite sides of the body 1, as shown. The body 1, with its extensions 5—5, can be secured to any suitable base, or work board, as 6, by means of screws 7—7, which also, in the present embodiment of the invention, secure the lower sides of the wings or extensions 5—5, to the body 1. Mounted to turn on the top of the body 1, at opposite sides of the center thereof, are two segmental gears 8—8, the corners, or points, 8', of which may be used as indicators in connection with graduation marks 9—9, on the top of said body, as clearly shown in Figs. 1 and 2. These segmental gear portions 8—8, are held in adjusted positions by thumb screws 10—10. The slotted tubular member 3, is provided around its opposite sides with gear ring portions 11—11, adapted, when said tubular member 3, is inserted vertically down into the open center of the body 1, to mesh with the segmental gears 8—8, as shown. Slidably mounted in the slotted tubular member 3, is a saw guide 12, comprising two plates projecting from either side of said slotted tubular member in the manner clearly shown in Figs. 2 and 3. Said plate members are secured in a slotted slideblock 13, in the tubular member 3, by means of screws 13'. Also mounted in said tubular member 3, above said guide member 12, is a spring 14, which operates to yieldingly depress the guide member 12, and normally hold it in down position, while allowing it to be moved up and down in the slotted tubular member 3. A saw can be inserted through the slotted tubular member 3, and between the guide plates of the guide member 12. With the parts in the positions shown in Fig. 2, the saw stands at right angles to the face of the body 1. By simply releasing the thumb screws 10—10, which hold the segmental gears 8—8, the saw and guide can be turned to any desired angle.

In case it is desired to cut a flat piece of wood on the base 6, and it is desired that the saw be held very steady, said tubular member can be reversed in the body 1, so that the guide plates 12, would project over the base 6, as in Fig. 3. Referring to Figure 4, the tubular member 3, can be withdrawn from the body, and the wing or extension members 5—5, detached or folded inwardly as shown, after the device has been detached from the base board 6, or other work board to which it may have been attached.

Thus I have provided a simple device of the character referred to which is easily disassembled and which is positive and accurate in its adjustments and operation.

I am aware that many changes can be made in the details of my device as here shown for illustrative purposes without departing from the spirit thereof and I do not therefore limit my invention to these details, except as I may be limited by the hereto appended claims.

I claim:

1. A miter box of the character shown and described comprising a body having an open vertical center and two detachable side wings, a slotted tubular member detachably and rotatably mounted in the open center of said body, guiding means to receive a saw slidably mounted in said slotted tubular member, a segmental gear on said body, a gear ring portion on said tubular member positioned to mesh with said segmental gear and means for locking said segmental gear, whereby said tubular member can be turned and held in different adjusted positions, substantially as described.

2. A miter box of the character referred to comprising a body having an open vertical center, two detachable wings or extensions whose faces are in the plane of the face of said body, a slotted tubular member rotatably mounted in the open center of said body, a split gear ring thereon, around the opposite sides of the slot therein, segmental gears rotatably mounted on said body, at opposite sides of said tubular member and meshing with said split gear ring on said tubular member, means for locking said segmental gear, and graduation marks associated with said segmental gear for indicating different positions of adjustment of said slotted tubular member, substantially as described.

3. A miter box of the character referred to comprising a body having an open center adapted to receive a slotted tubular member and having its corners beveled at opposite sides thereof, a slotted tubular member detachably and rotatably mounted in said open center, a saw guide slidably mounted in said tubular member and having guide plates projecting through the slot thereof, a spring in said tubular member normally depressing said saw guide, gear ring portions around said tubular member at opposite sides of the slot thereof, segmental gears mounted on said body and in mesh with said gear ring portions, graduation marks associated with the angle portion of said segmental gear for determining different positions of adjustment of said tubular member, and means for securing said slotted tubular member in different adjusted positions, substantially as described.

4. A miter box of the character shown and described comprising a body portion having an open center and detachable side wings or extensions, the faces of which are in the plane of the face of said body, means for detachably securing said body and said wings to a work board, a slotted tubular member rotatably and detachably mounted in the open center of said body, gear ring portions on said slotted tubular member at the top of said body, segmental gears mounted on the top of said body and in mesh with said gear ring portions at opposite sides of said tubular member, whereby the turning of said tubular member also turns said segmental gears in opposite directions, a scale adjacent to said segmental gears co-operating to indicate different positions of adjustment, a saw guide slidably mounted in said tubular member with guide plates projecting from the slot therein, and a spring in said tubular member above said saw guide for normally depressing said saw guide, substantially as described.

Signed at Los Angeles, Los Angeles County, California this 7th day of January, 1922.

LEE F. PERLICK.

Witnesses:
W. R. LITZENBERG,
GEORGE B. MORRIS.